United States Patent [19]

Bibbens

[11] 3,894,619
[45] July 15, 1975

[54] SYNCHRONIZER RING ASSEMBLY

[76] Inventor: William H. Bibbens, 16500 N. Park Dr., Southfield, Mich. 48075

[22] Filed: July 8, 1974

[21] Appl. No.: 486,293

[52] U.S. Cl. .......................... 192/53 F; 192/67 R
[51] Int. Cl.² ................ F16D 11/10; F16D 13/00
[58] Field of Search... 192/53 R, 53 F, 67 R, 107 R, 192/107 M, 108, 114

[56] References Cited
UNITED STATES PATENTS

| | | | |
|---|---|---|---|
| 2,864,476 | 12/1958 | Ashauer et al. | 192/53 F |
| 2,896,760 | 7/1959 | Hebbinghaus | 192/53 F |
| 2,941,641 | 6/1960 | Stump | 192/53 F |
| 3,085,667 | 4/1963 | Lang | 192/107 R X |
| 3,347,347 | 10/1967 | Hetmann | 192/107 M X |
| 3,618,724 | 11/1971 | Oehl | 192/53 F |
| 3,741,358 | 6/1973 | Magnier | 192/53 F |

*Primary Examiner*—Samuel Scott
*Assistant Examiner*—Lance W. Chandler
*Attorney, Agent, or Firm*—Reising, Ethington & Perry

[57] ABSTRACT

A synchronizer ring assembly including an internally toothed, cylindrical sleeve of high strength metal with a shifting collar of plastic material mounted on the outer surface of the metallic sleeve. The shifting collar is formed with a shifter fork slot and is interlocked with the sleeve to prevent axial displacement of the shifting collar with respect to the sleeve. In one embodiment, the shifting collar is freely rotatable with respect to the sleeve. In other embodiments, the shifting collar is secured against rotative motion with respect to the sleeve.

12 Claims, 4 Drawing Figures

SYNCHRONIZER RING ASSEMBLY

This invention relates generally to transmissions, and is particularly concerned with the construction of a synchronizing ring of the type that is shiftable from one position to another to engage and disengage one gear member from another.

BACKGROUND OF THE INVENTION

Description of the Prior Art

Synchronizing elements for transmissions are generally made wholly of steel or other high strength, relatively heavy, metal. Such synchronizing elements generally include an internally toothed sleeve formed with an annular slot for receiving the legs of a shifter fork. The synchronizer sleeve element is shiftable by the shifter fork from one axial position to another to either connect or interrupt the drive between two externally toothed gear members. If the synchronizer element is of all metal construction, the cost and weight are high. Furthermore, the frictional engagement between the shifter fork and the walls of the shifter fork slot decreases the ability of the teeth of the synchronizing sleeve element to smoothly engage the teeth of a driven gear element when the synchronizing sleeve element is shifted to engage the driven gear element with a driving gear element. The frictional drag between the shifter fork and the shifter fork slot resists free rotation of the synchronizing sleeve and thus increases the impact on the teeth thereof as the teeth attempt to engage with the teeth of the driven gear element.

Summary of the Invention

In accordance with the present invention, a synchronizer ring assembly includes an internally toothed, cylindrical sleeve of relatively high strength material such as steel or other metal with a shifting collar which is preferably or relatively low strength and light weight plastic material mounted on the outer surface of the sleeve in coaxial relationship therewith. However, one aspect of the invention is in the provision of an assembly of a toothed sleeve with a rotatable shifter collar mounted thereon, regardless of material. The plastic collar is integrally formed with an annular shifter fork engagement means which is coaxial with the sleeve and collar. Interlock means is provided between the collar and sleeve operable to prevent relative movement between the collar and sleeve at least in an axial direction.

In one embodiment, the interlock means permits free rotation of the collar with respect to the sleeve member. In other embodiments, the interlock means prevents both axial and rotative motion of the collar with respect to the sleeve.

Among the advantages of the invention are the substantial reduction in cost and weight of the material which is provided by the utilization of a plastic shifter collar secured to the synchronizer sleeve, which sleeve must, of necessity, be of high strength, relatively heavy material. The loads imposed on the shifting collar by the shifter fork can be more than adequately accommodated by the plastic material, and the plastic material has relatively high lubricity properties that decreases the frictional drag between the shifter fork and the walls of the shifter fork slot.

Other objects, advantages and features of the invention will be apparent from the following detailed description of several embodiments of the invention, taken in connection with the accompanying drawings.

DETAILED DESCRIPTION OF THE PREFERRED EMBODIMENTS

Figure 1:
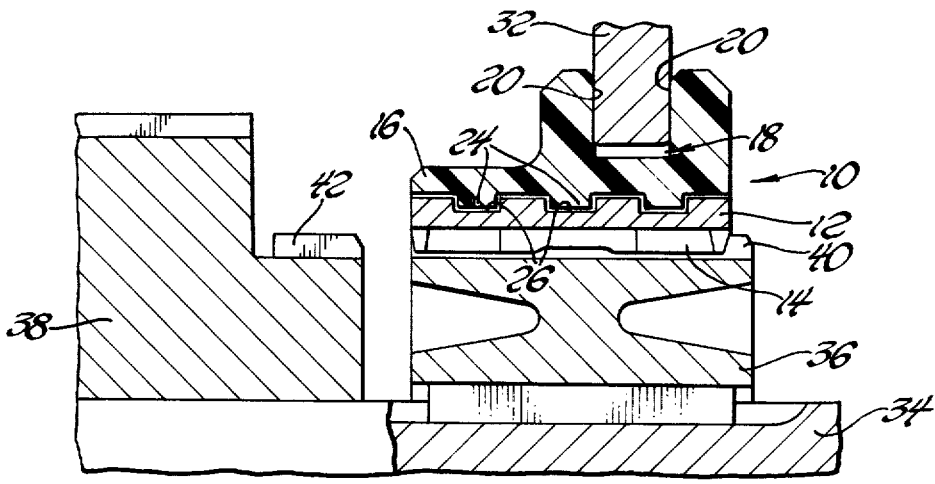
FIG. 1 is a fragmentary, sectional view of a transmission with a synchronizer ring assembly according to the present invention incorporated therein.
Figure 2:
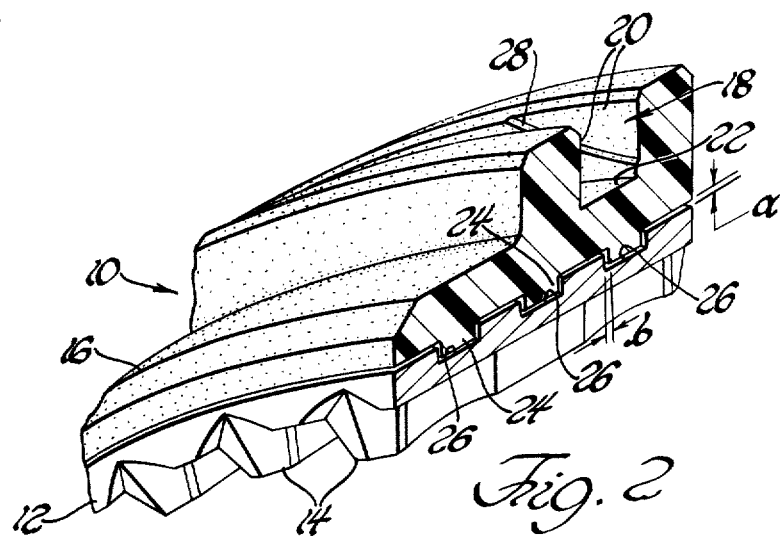
FIG. 2 is a fragmentary perspective view of the synchronizer ring assembly shown in FIG. 1.

In FIGS. 1 and 2, reference numeral 10 collectively designates a synchronizer ring assembly including a cylindrical sleeve member 12 formed with internal teeth 14. Reference numeral 16 designates a shifting collar member of relatively low strength and light weight plastic material mounted on the outer surface of the sleeve member 12 in coaxial relationship therewith. The teeth 14 on the sleeve member 12 are illustrated as having the same configuration as the teeth shown in U.S. Pat. No. 3,334,715. However, it should be understood that the specific configuration of the teeth form no part of the present invention.

The collar member 16 is integrally formed with an annular shifter fork engagement means, which, in the illustrated embodiment, is in the form of an annular slot 18 having a pair of spaced side walls 20 extending from an end wall or base 22.

Interlock means is provided between the collar and sleeve members operable to prevent relative movement between the collar and sleeve members at least in an axial direction. The interlock means, in the FIG. 2 embodiment, comprises annular ribs 24 formed integrally on the inner wall of the collar 16 and received in annular grooves 26 formed in the outer wall of the sleeve 12. The engagement between the ribs 24 and grooves 26 prevents axial displacement of the collar with respect to the sleeve. However, in the FIG. 2 embodiment, the ribs 24 and grooves 26 have a loose fit relationship with each other so as to permit free rotation of the collar 16 with respect to the sleeve 12. As illustrated in FIG. 2, a clearance a is provided between the inner wall of the collar 16 and the outer wall of the sleeve 12, and a clearance b is provided between the surfaces of the ribs 24 and grooves 26.

Formed in the side walls 20 of the shifter fork slot 18 are grooves 28 for oil or other lubricant. The lubricant groove 28 shown in FIG. 2 has one end that communicates with the outer edge of the side wall 20 adjacent the open end of the slot 18. The groove 28 extends from its end adjacent the open end of the slot gradually downwardly toward the end wall 22 defining the closed end of the slot, the gradual inclination of the groove 28 being in a direction preferably opposite the direction of rotation of the collar.

The collar 16 may be of molded plastic material, and by "plastic" is meant organic polymeric material such as NYLON, DELRIN, polypropylene, and the like. Such plastics have sufficient strength to accommodate the loads imposed on the collar 16 by the shifter fork received in the shifter fork slot 18, and are not only of substantially lighter weight and less cost than the material required for the synchronizer sleeve 12, but also have low friction or high lubricity properties to reduce the frictional forces imposed on the collar by the shifter fork. Consequently, there is less resistance to rotation of the teeth 14 as they seek to engage with the teeth of a driven gear when the synchronizer ring assembly 10 is shifted from a non-engaged to engaged position.

FIG. 1 illustrates a portion of a power transmission including a shaft 34 on which are mounted gears 36 and 38 having external teeth 40 and 42, respectively. The gear 36 is nonrotatably mounted on the shaft 34 while the gear 38 is freely rotatable with respect to the shaft 34. The synchronizer ring 12 of FIG. 2 is shown mounted on the gear 36 with its teeth 14 slidably, nonrotatably engaged with the teeth 40 of gear 36. A shifter fork 32 is engaged with the slot 18 formed in the collar 16, the shifter fork being operable to shift the assembly 10 to the left in FIG. 1 to cause the teeth 14 of the synchronizer sleeve 12 to engage the teeth 42 of gear 38 and couple the gears 36 and 38 together.

The clearances a and b (FIG. 2), together with the low friction properties of the material of the collar 16, offer little or no resistance to rotation of the sleeve 12 with respect to the collar 16. Lubricants applied to the slot 18 through the lubricant grooves 28 further reduces the likelihood of frictional interference from the engagement of the shifter fork 32 with the side walls 20 of the shifter fork slot 18. Consequently, when the assembly 10 is shifted to the left in FIG. 1 to cause the teeth 14 to mesh with the teeth 42, the free rotation of the synchronizer sleeve 12 reduces the impact forces on the teeth 14 and permits the teeth 14 to promptly align themselves for meshed engagement with the teeth 42.

Figure 3:
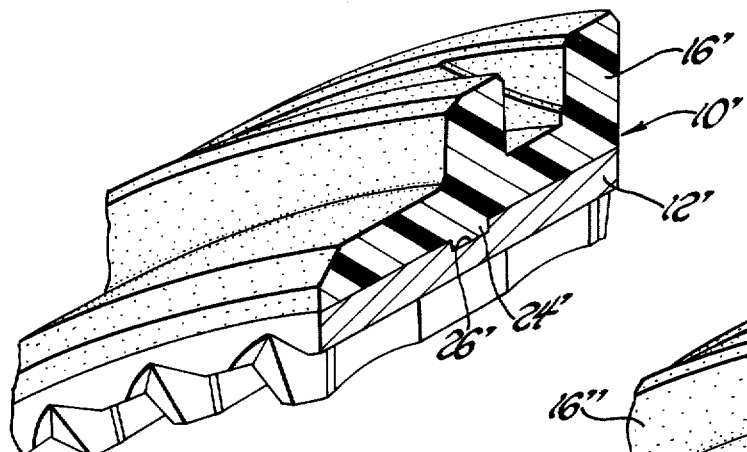
FIG. 3 is a view similar to FIG. 2 of a synchronizer ring assembly embodying the invention in a second form.

In the embodiment of FIG. 3, the shifting collar and synchronizer ring are not freely rotatable with respect to each other. In FIG. 3, the synchronizer ring assembly 10' is identical to the assembly 10 in FIG. 2 except that the shifting collar 16' and synchronizer ring 12' of FIG. 3 are not freely rotatable with respect to each other. In FIG. 3, the interlock means is in the form of a rib 24' formed on the shifting collar 16', the rib 24' being received in a groove 26' formed in the sleeve 12'. Rib 24' and groove 26' have a relatively tight fit relationship with each other, and the clearance a of FIG. 2 is omitted, the inner surface of the shifting collar 16' being in relatively tight fit relationship with the outer surface of the synchronizer sleeve 12'.

Figure 4:
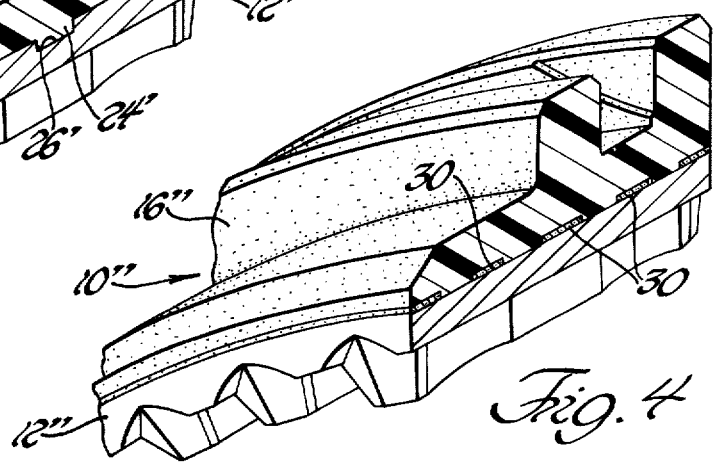
FIG. 4 is a view similar to FIG. 2 illustrating a synchronizer ring assembly embodying the invention in still a third form.

In the FIG. 4 embodiment, the synchronizer ring assembly 10'' includes a shifting collar 16'' which is secured to the outer surface of a synchronizer sleeve 12'' by adhesive bonding strips indicated by reference numeral 30 in FIG. 4. Consequently, the shifting collar 16'' is secured against axial and rotative displacement with respect to the synchronizer sleeve 12'.

Except for the manner in which the shifting collars 16' and 16'' are secured to the respective sleeve members 12' and 12'', the construction of the assemblies are identical to the construction shown in FIG. 2.

In the embodiments of FIGS. 3 and 4, even though the shifting collars are not freely rotatable with respect to the synchronizer rings, the light weight provided by the plastic material of the shifting collars, together with the low friction characteristics of the plastic material enhances the ability of the synchronizer assemblies to rotate relative to the shifter fork to reduce the impact on the teeth as they move into engagement with the teeth of a driven member.

While specific forms of the invention have been described in the foregoing specification and illustrated in the accompanying drawings, it should be understood that the invention is not limited to the exact construction shown. To the contrary, various alterations in the construction and arrangement of parts, all falling within the scope and spirit of the invention, will be apparent to those skilled in the art. For example, while the preferred material of the collar member is stated to be plastic, it is obvious that other materials may be used to achieve the ends of the invention.

The embodiments of the present invention in which an exclusive property or privilege is claimed are defined as follows:

1. A synchronizer ring assembly comprising: an internally toothed, cylindrical sleeve member of metal material; a shifting collar member of plastic material mounted on the outer surface of said sleeve member in coaxial relationship therewith, said collar member being formed with an annular shifter fork engagement means coaxial with said sleeve and collar members; and interlock means between said collar and sleeve members operable to prevent relative movement between said members at least in an axial direction.

2. A synchronizer ring assembly as claimed in claim 1 wherein said interlock means permits free rotation of said collar member with respect to said sleeve member.

3. A synchronizer ring assembly as claimed in claim 2 wherein said interlock means comprises at least one annular rib on one of said members, and an annular groove on the other of said members receiving said rib, said rib and groove being coaxial with said members and having a sufficiently loose fit relationship with each other as to permit free rotation between said members.

4. A synchronizer ring assembly as claimed in claim 3 wherein said annular shifter fork engagement means comprises a slot having a pair of side walls; and further including at least one lubricant groove formed in a side wall of said slot, one end of said lubricant groove communicating with the outer edge of said side wall adjacent the open end of said slot.

5. A synchronizer ring assembly as claimed in claim 1 wherein said annular shifter fork engagement means comprises a slot having a pair of side walls; and further including at least one lubricant groove formed in a side wall of said slot, one end of said lubricant groove communicating with the outer edge of said side wall adjacent the open end of said slot.

6. A synchronizer ring assembly as claimed in claim 1 wherein said interlock means prevents relative rotation of said members.

7. A synchronizer ring assembly as claimed in claim 6 wherein said interlock means comprises at least one annular rib in one of said members, and an annular groove on the other of said members receiving said rib, said rib and groove being coaxial with said members and having a relatively tight fit relationship with each other to restrain said members against relative rotation.

8. A synchronizer ring assembly as claimed in claim 6 wherein said interlock means comprises an adhesive bond between said members.

9. A synchronizer ring assembly comprising: an internally toothed, cylindrical sleeve member of metal; a shifting collar member, of synthetic plastic material, mounted on the outer surface of said sleeve member in coaxial relationship therewith, said collar member being formed with an annular shifter fork slot coaxial with said members; a plurality of annular ribs formed on one of said members, a plurality of annular grooves, equal in number to said ribs, formed on the other of said members with each of said ribs being received in one of said grooves, said ribs and grooves having a loose fit relationship to permit free rotation of said members with respect to each other while preventing axial displacement of said members with respect to each other.

10. A synchronizer ring assembly comprising: an internally toothed, cylindrical sleeve member of metal; a shifting collar member, of synthetic plastic material, mounted on the outer surface of said sleeve member in coaxial relationship therewith, said collar member being formed with an annular shifter fork slot coaxial with said members; and interlock means securing said members against axial and rotative motion with respect to each other.

11. A synchronizer ring assembly comprising: an internally toothed, cylindrical sleeve member; a shifting collar member of a different material than said sleeve member mounted on the outer surface of said sleeve member in coaxial relationship therewith, said collar member being formed with an annular shifter fork engagement means coaxial with said sleeve and collar members; and interlock means between said collar and sleeve members operable to prevent relative movement between said members at least in an axial direction.

12. A synchronizer ring assembly comprising: an internally toothed, cylindrical sleeve member; a shifting collar member mounted on the outer surface of said sleeve member in coaxial relationship therewith, said collar member being formed with an annular shifter fork engagement means coaxial with said sleeve and collar members; and interlock means between said collar and sleeve members operable to prevent relative movement between said members at least in an axial direction wherein said interlock means permits free rotation of said collar member with respect to said sleeve member.

* * * * *